(No Model.) 2 Sheets—Sheet 1.

J. & P. JUST.
AGRICULTURAL BOILER.

No. 367,209. Patented July 26, 1887.

Fig. 2×

Witnesses
F. L. Ourand
B. G. Cowl

John Just
Peter Just
Inventor

By their Attorneys
Louis Bagger & Co.

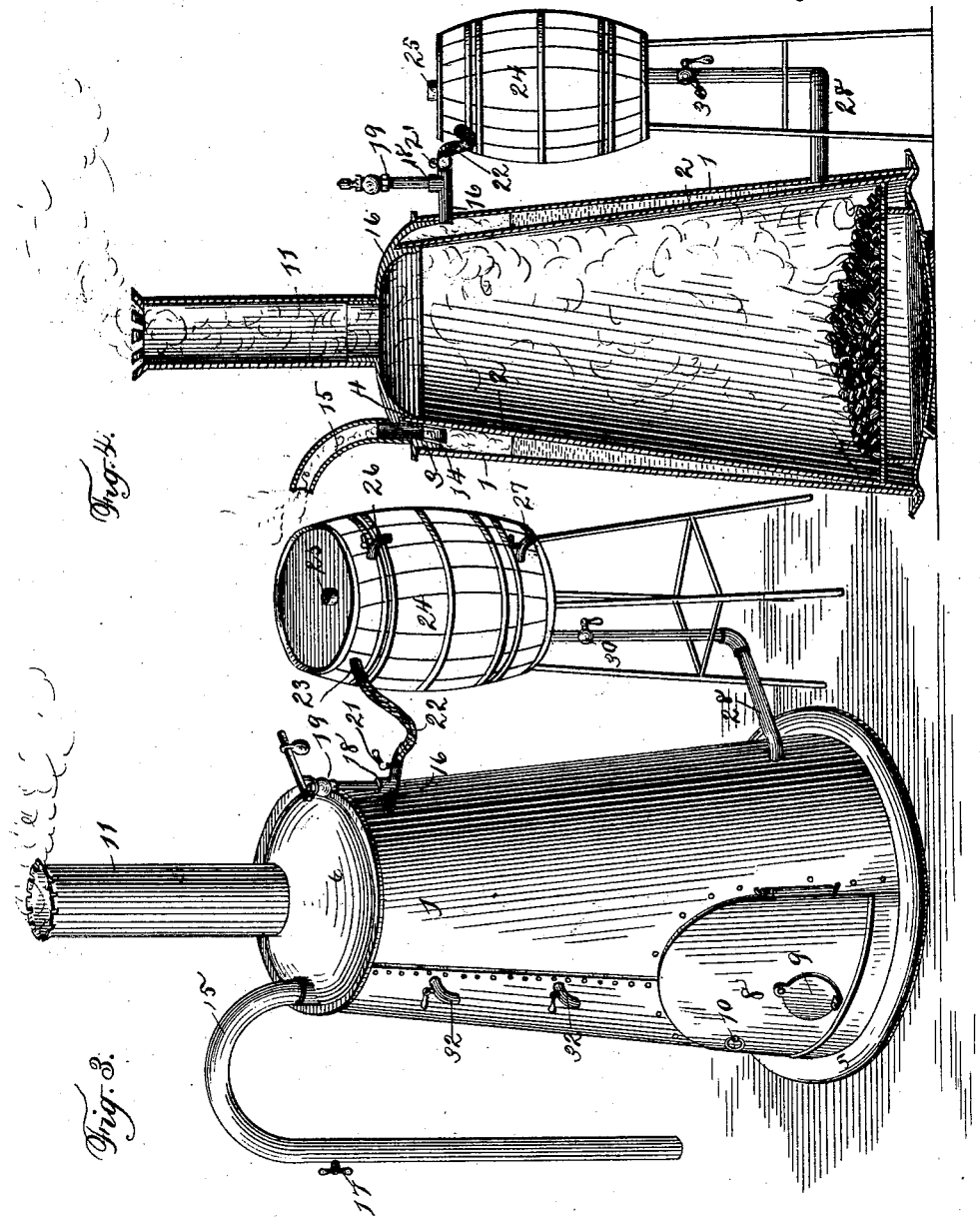

UNITED STATES PATENT OFFICE.

JOHN JUST AND PETER JUST, OF SAUK CITY, WISCONSIN.

AGRICULTURAL BOILER.

SPECIFICATION forming part of Letters Patent No. 367,209, dated July 26, 1887.

Application filed January 24, 1887. Serial No. 225,315. (No model.)

*To all whom it may concern:*

Be it known that we, JOHN JUST and PETER JUST, both residents of Sauk City, in the county Sauk and State of Wisconsin, have invented certain new and useful Improvements in Agricultural Boilers; and we do hereby declare that the following is a full, clear, and exact description of the invention, which will enable others skilled in the art to which it appertains to make and use the same, reference being had to the accompanying drawings, which form a part of this specification, and in which—

Figure 1:
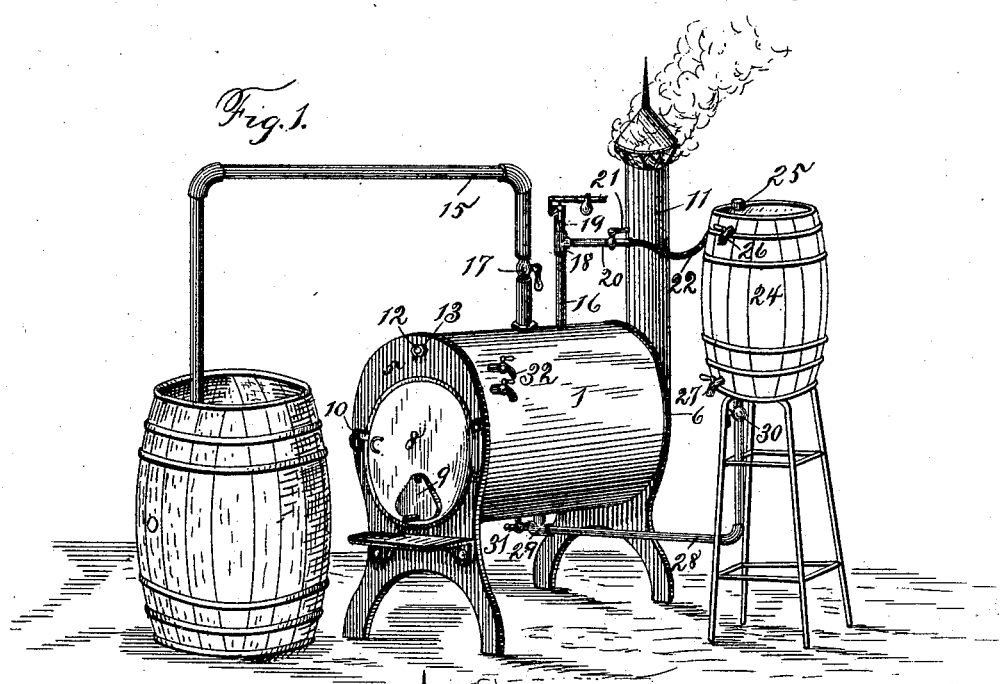
Figure 2:
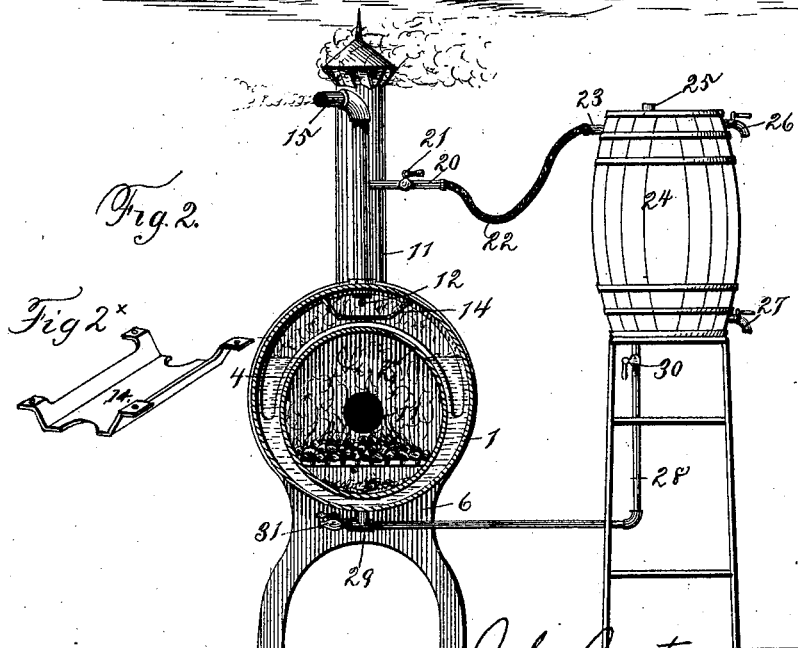

Figure 1 is a perspective view of our improved agricultural boiler. Fig. 2 is a transverse sectional view of the same. Fig. $2^\times$ is a perspective view of the shield or deflector. Fig. 3 is a perspective view of an upright form of our boiler, and Fig. 4 is a vertical sectional view of this form.

Similar numerals of reference indicate corresponding parts in all the figures.

Our invention has relation to agricultural boilers used for the purpose of steaming feed for animals, and for steaming, cooking, and heating purposes generally; and it consists in the improved construction and combination of parts of such a boiler, as hereinafter more fully described and claimed.

In the accompanying drawings, the numeral 1 indicates the outer shell of the boiler, which is shown cylindrical in the first two figures, and to which we shall first have reference. Inside of this horizontal and cylindrical outer shell is eccentrically secured a fire-tube or furnace-tube, 2, and the ends of the outer cylinder and the inner fire-tube are secured upon two registering sets of flanges, 3 and 4, upon the forward and rear heads, 5 and 6, of the boiler.

The front head of the boiler is provided with an aperture, formed inside of the eccentric flange, and this aperture is closed by means of a hinged fire-door, 8, having suitable draft-aperture, 9, and having a suitable latch, 10. The rear head of the boiler is provided with a smoke-stack, 11, and a rod, 12, passes through both heads near their upper edges, and is provided with nuts 13 for drawing the heads together.

A shield or deflector, 14, is supported inside of the boiler in the upper portion of the same, having spaces formed between its edges and ends and the sides and heads of the boiler-shell, and the steam outlet pipe 15 and the safety-valve pipe 16 are inserted into the top of the boiler, the outlet-pipe being curved downward and provided with a suitable valve, 17, by means of which the supply of steam may be cut off, the steam used for the cooking or other purposes being supplied through this outlet-pipe.

The safety-valve pipe is provided at its upper end with a joint, 18, the upper end of which forms a seat, 19, for the valve, while the end of a pipe, 20, having a cock, 21, is inserted into the horizontal branch of the joint, and is connected by means of a flexible tube, 22, to a joint, 23, inserted into the upper end of the feed-water barrel 24. This barrel or reservoir is placed slightly elevated over the boiler, and is provided with a filling-aperture, 25, in its top and with cocks 26 and 27, near its top and bottom, the upper cock serving to test the water-level in the barrel when it is filled and the lower cock serving to draw off water from the barrel.

A feed-pipe, 28, enters the barrel with its upper end and has its lower end secured in a T-joint, 29, in the bottom of the boiler, and the feed-pipe is provided with a suitable cock, 30, while the horizontal branch of the T-joint, opposite to the branch into which the feed-pipe enters, is provided with a blow-off cock, 31, through which the boiler may be blown off.

The side of the boiler is provided with the usual gage-cocks, 32, by means of which the water-level may be ascertained.

When the boiler is to be used, the barrel or reservoir is filled and water let into the boiler through the feed-pipe, whereupon the fire is started, and when the water-level becomes low in the boiler the cock upon the steam-pipe extending from the safety-valve pipe is opened, as is also the cock upon the feed-pipe, when the water from the barrel will flow through the feed-pipe and into the boiler. The steam passing out through the outlet-pipe to its destination will be dry and free from water, as the shield or deflector covering the opening for the pipe in the top of the boiler will prevent water from passing into the pipe as it is agitated by boiling, thus rendering the steam more serviceable, and causing the boiler to be run with less water than a boiler in which the water is liable to pass over with the steam. The heating-surface of the eccentrically-arranged cylindrical fire-tube is comparatively large for the boiler, and the space between the bottom of the tube and the shell of the boiler is very narrow, so that the water will be heated very quickly and steam will be quickly generated.

In Figs. 3 and 4 are shown views of a different form of the boiler, the boiler being shown vertical and with the smoke-stack in the top. The outlet-pipe is secured in the upper head or top of the boiler, and the steam-supply pipe for the barrel or reservoir extends from near the upper end of the boiler, while the feed-pipe extends from the barrel or reservoir into the lower end of the boiler. The outlet-pipe is provided with a curved pan or shield under the end entering the top of the boiler, the said pan or shield serving the same purpose as the shield or deflector in the horizontal boiler, and the functions of all the parts of the boiler are exactly the same as of the horizontal boiler.

Having thus described our invention, we claim and desire to secure by Letters Patent of the United States—

The combination, with a steam-boiler, of a pipe entering the top of the same, and having a suitable stop-cock and provided with a safety-valve, an outlet-pipe entering the top of the boiler, and having a stop cock or valve, a feed-water barrel or reservoir supported above the boiler, and having a pipe near its top connected to the safety-valve pipe by a flexible tube, and having gage-cocks and a filling-aperture, and a feed-pipe extending from the bottom of the barrel to the bottom of the boiler, as and for the purpose shown and set forth.

In testimony that we claim the foregoing as our own we have hereunto affixed our signatures in presence of two witnesses.

JOHN JUST.
PETER JUST.

Witnesses:
J. S. TRIPP,
C. JAEGER.